United States Patent [19]
McLaughlin et al.

[11] Patent Number: 5,568,389
[45] Date of Patent: Oct. 22, 1996

[54] METHOD AND APPARATUS FOR CONTROLLING AN ELECTRIC ASSIST STEERING SYSTEM

[75] Inventors: Kevin M. McLaughlin, Troy; Joseph D. Miller, Farmington Hills, both of Mich.

[73] Assignee: TRW Inc., Lyndhurst, Ohio

[21] Appl. No.: 212,112

[22] Filed: Mar. 11, 1994

[51] Int. Cl.$^6$ ................................................ B62D 5/04
[52] U.S. Cl. ........................................ 364/424.05; 180/446
[58] Field of Search ........................ 364/424.05; 180/79.1, 180/140, 141, 142, 143

[56] References Cited

U.S. PATENT DOCUMENTS

| | | | |
|---|---|---|---|
| 3,983,953 | 10/1976 | Bayle | 180/79.1 |
| 4,415,054 | 11/1983 | Drutchas | 180/79.1 |
| 4,582,155 | 4/1986 | Ohe | 180/79.1 |
| 4,753,309 | 6/1988 | Marumoto et al. | 180/79.1 |
| 4,760,892 | 8/1988 | Duffy | 180/142 |
| 4,794,997 | 1/1989 | North | 180/79.1 |
| 4,800,974 | 1/1989 | Wand et al. | 180/79.1 |
| 4,874,053 | 10/1989 | Kimura et al. | 180/79.1 |
| 4,877,099 | 10/1989 | Duffy | 180/142 |
| 4,934,472 | 6/1990 | Bloor et al. | 180/79.1 |
| 5,053,966 | 10/1991 | Takahashi et al. | 180/79.1 |
| 5,097,420 | 3/1992 | Morishita | 180/79.1 |
| 5,198,982 | 3/1993 | Collier-Hallman et al. | 364/424.05 |
| 5,257,828 | 11/1993 | Miller et al. | 180/79.1 |

*Primary Examiner*—Gary Chin
*Attorney, Agent, or Firm*—Tarolli, Sundheim, Covell, Tummino & Szabo

[57] ABSTRACT

A steering assist system (10) providing assist in response to a steering control signal includes a vehicle speed sensor (150) for sensing vehicle speed and for providing a speed signal having a value indicative of the sensed vehicle speed and a torque sensor (110) operatively connected to a vehicle hand wheel (12) for providing a torque signal indicative of applied steering torque. A controller (120) is connected to the vehicle speed sensor (150) and to the torque sensor (110). The controller (120) includes a first set of torque-in vs. torque-out assist values (132) associated with a first vehicle speed and a second set of torque-in vs. torque-out assist values (130) associated with a second vehicle speed. The controller (120) provides the steering control signal in response to applied steering torque and having a value functionally related to (i) the vehicle speed signal and (ii) both the first set and second set of torque-in vs. torque-out assist values.

9 Claims, 3 Drawing Sheets

METHOD AND APPARATUS FOR CONTROLLING AN ELECTRIC ASSIST STEERING SYSTEM

TECHNICAL FIELD

The present invention is directed to an electric assist steering system and is particularly directed to a method and apparatus for controlling an electric assist steering system to improve steering feel.

BACKGROUND OF THE INVENTION

Electric assist steering system are well known in the art. Electric power assist steering systems that utilize a rack and pinion gear set provide power assist by using an electric motor to either (i) apply rotary force to a steering input shaft connected to a pinion gear, or (ii) apply linear force to a steering member having the rack teeth thereon. The electric motor in such systems is typically controlled in response to (i) a driver's applied torque to the vehicle steering wheel, and (ii) sensed vehicle speed.

In U.S. Pat. No. 3,983,953, an electric motor is coupled to the input steering shaft and energized in response to the torque applied to the steering wheel by the vehicle operator. An electronic control system includes a torque sensor and a vehicle speed sensor. A computer receives the output signals provided by both sensors. The computer controls the amount of the assistance provided by the motor dependent upon the applied steering torque and the sensed vehicle speed.

U.S. Pat. No. 4,415,054 to Drutchas (now U.S. Reissue U.S. Pat. No. 32,222,), assigned to TRW Inc., includes a D.C. electric assist motor driven through an H-bridge arrangement. The motor includes a rotatable armature encircling a steering member which has a thread convolution portion and a portion having straight cut rack teeth thereon. Rotation of the electric assist motor armature causes linear movement of the steering member through a ball-nut drive arrangement drivably coupled to the thread convolution portion of the steering member. A torque sensing device is coupled to the steering column to sense driver applied input torque to the steering wheel. The torque sensing device uses a magnet Hall-effect sensor arrangement for sensing relative rotation between the input and output shafts across a torsion bar. An electronic control unit ("ECU") monitors the signal from the torque sensing device and controls the electric assist motor in response thereto. A vehicle speed sensor provides a signal to the ECU indicative of the vehicle speed. The ECU controls current through the electric assist motor in response to both the sensed vehicle speed and the sensed torque demand signal. The ECU decreases steering assist as vehicle speed increases. This is commonly referred to in the art as speed proportional steering.

U.S. Pat. No. 4,660,671 discloses an electric controlled steering system that is based on the Drutchas steering gear. In the '671 arrangement, the D.C. motor is axially spaced from the ball-nut and is operatively connected thereto through a connection tube. The electronic controls includes a plurality of diagnostic features that monitor the operation of the steering system. If an error in the operation of the electric steering system is detected, the power assist system is disabled and steering reverts to an unassisted mode.

U.S. Pat. No. 4,794,997 to North, assigned to TRW Cam Gears Limited, discloses an electric assist steering system having an electric motor operatively connected to the rack through a ball nut. A vehicle speed sensor and an applied steering torque sensor are operatively connected to an ECU. The ECU controls electric current through the motor as a function of both applied steering torque and sensed vehicle speed. The current is controlled by controlling the percentage of the pulse-width-modulated ("PWM") signal applied to the motor. As the PWM increases, power assist increases. The ECU or computer is preprogrammed with discrete control curves that provide steering assist values (PWM values), also referred to as torque-out values, as a function of applied steering torque, also referred to as torque-in values, for a plurality of predetermined discrete vehicle speed values. Each vehicle speed value as an associated torque-in vs. torque-out control curve.

FIG. 3 of the '997 patent shows torque-in vs. torque-out control curves stored in the ECU. There is a torque-in vs. torque-out curve used for low speed vehicle maneuvering such as vehicle parking. Also, there is a torque-in vs. torque-out curve used for high speed maneuvering. Each of these control curves permits maximum assist should the applied steering torque reach an associated value. For vehicle speeds between the minimum speed curve and the maximum speed curve, a plurality of discrete curves are provided. The other discrete vehicle speed curves are all between the low and high speed curves. From these torque-in vs. torque-out curves, it can be seen that power assist decreases as vehicle speed increases. The transition from one level of power assist to another level of power assist for the different vehicle speeds occurs in steps or jumps. Changes in assist level in this type of system can be felt by the vehicle operator when vehicle speed changes occur during a steering maneuver.

SUMMARY OF THE PRESENT INVENTION

The present invention is directed to a method and apparatus for controlling an electric assist steering system that provides a smooth speed proportional control of torque-in vs. torque-out control of the electric assist motor. A low speed and a high speed torque-in vs. torque-out control curves are established. The torque-in vs. torque-out values for vehicle speeds between the low and high speed values are interpolated as a function of the low and high speed values.

In accordance with the present invention, an apparatus is provided for controlling a steering assist system, the steering assist system providing assist in response to a steering control signal. The apparatus comprises vehicle speed sensing means for sensing vehicle speed and for providing a speed signal having a value indicative of the sensed vehicle speed and torque sensing means operatively connected to a vehicle hand wheel for sensing applied steering torque and for providing a torque signal indicative of the applied steering torque. The apparatus further comprises control means operatively connected to the vehicle speed sensing means and to the torque sensing means. The control means includes a first set of torque-in vs. torque-out assist values associated with a first vehicle speed and a second set of torque-in vs. torque-out assist values associated with a second vehicle speed. The control means provides the steering control signal in response to applied steering torque and having a value functionally related to (i) the speed signal and (ii) both the first set and second set of assist values.

In accordance with a preferred embodiment of the present invention, the first vehicle speed is a relatively low vehicle speed and the torque-in vs. torque-out values associated with the first vehicle speed increases in accordance with a first substantially parabolic function after a first predetermined torque-in value is exceeded. The second vehicle speed is a relatively high vehicle speed and the torque-in vs. torque-out values associated with the second vehicle speed increases in accordance with a second substantially parabolic function after a second predetermined torque-in value is exceeded. The second predetermined torque-in value is less than the first predetermined torque-in value. The control value is functionally related to a requested torque assist value $T_{ASSIST}$ determined according to $$T_{ASSIST}=(K_{SP} \times T_{LOW})+((K_{SPMAX}-K_{SP}) \times T_{HIGH})$$

where $T_{LOW}$ is the torque-out value in accordance with the first set of assist values, $T_{HIGH}$ is the torque-out value in accordance with the second set of assist values, $K_{SP}$ is a speed proportion value that decreases as vehicle speed increases, and $K_{SPMAX}$ is the maximum speed proportional value at low vehicle speed.

In accordance with the present invention, a method for controlling a steering assist system where the steering assist system provides steering assist in response to a steering control signal comprises the steps of sensing vehicle speed and providing a speed signal having a value indicative of the sensed vehicle speed and sensing applied steering torque and providing a torque signal indicative of applied steering torque. The method further includes the steps of providing a first set of torque-in vs. torque-out assist values associated with a first vehicle speed and providing a second set of torque-in vs. torque-out assist values associated with a second vehicle speed. The method also includes providing said steering control signal in response to applied steering torque and having a value functionally related to (i) the vehicle speed signal and (ii) both the first set and second set of torque-in vs. torque-out assist values.

In accordance with a preferred embodiment of the present invention, the method step of providing said steering control signal includes determining a requested torque assist value $T_{ASSIST}$ determined according to $$T_{ASSIST}=(K_{SP} \times T_{LOW})+((K_{SPMAX}-K_{SP}) \times T_{HIGH})$$

where $T_{LOW}$ is the torque-out value in accordance with the first set of assist values, $T_{HIGH}$ is the torque-out value in accordance with the second set of assist values, $K_{SP}$ is a speed proportion value that decreases as vehicle speed increases, and $K_{SPMAX}$ is the maximum speed proportional value at low vehicle speed.

BRIEF DESCRIPTION OF THE DRAWINGS

Other features and advantages of the present invention will become apparent to those skilled in the art to which the present invention relates from a reading of the following detailed description with reference to the accompanying drawings, in which.

DESCRIPTION OF PREFERRED EMBODIMENT

Figure 1:
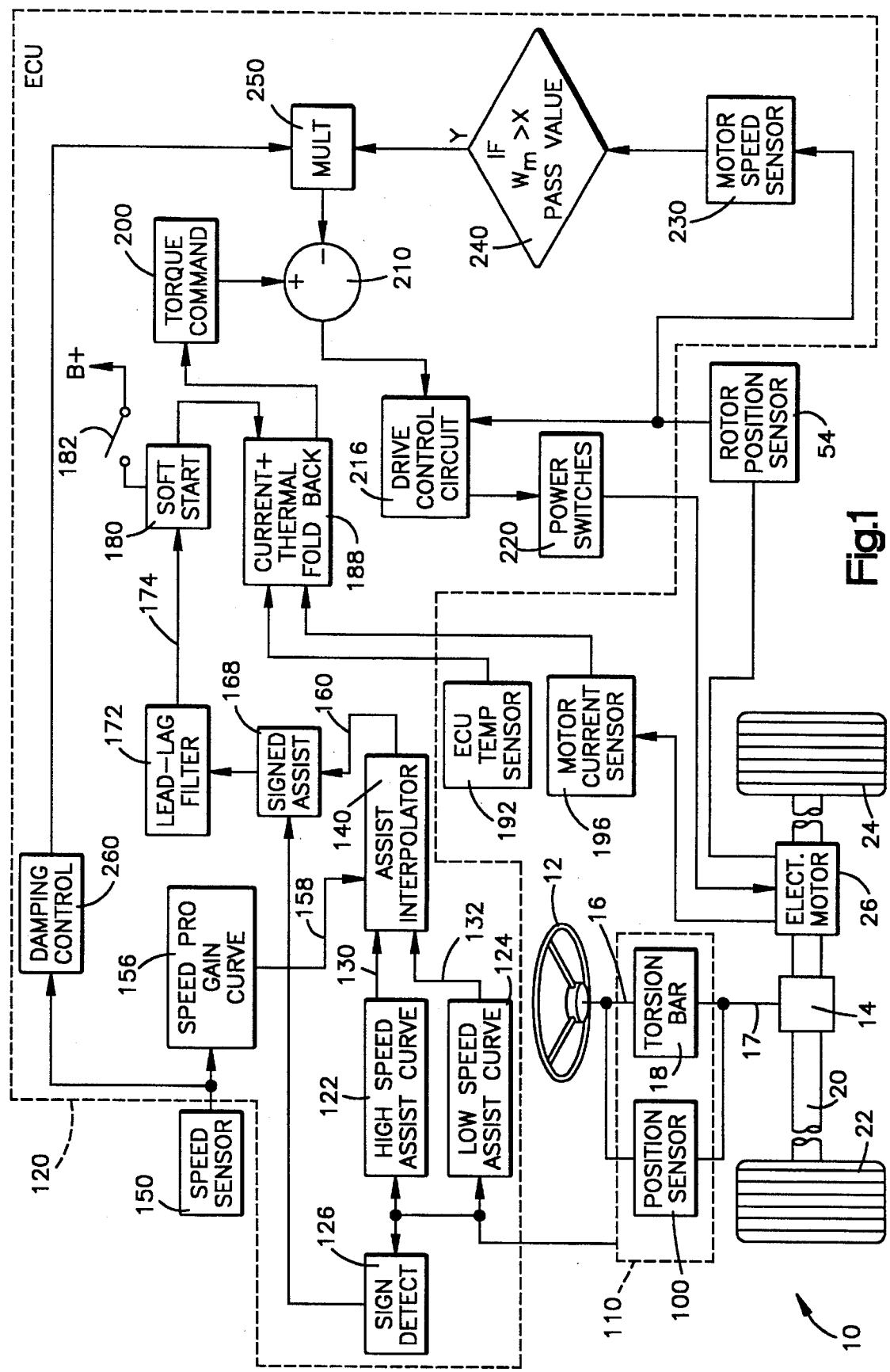
FIG. 1 is a schematic block diagram illustrating a electric assist steering system in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to an output shaft 17. The input shaft 16 is operatively coupled to the output shaft 17 through a torsion bar 18. The torsion bar 18 twists in response to applied steering torque thereby permitting relative rotation between the input shaft 16 and the output shaft 17. Stops, not shown, limit the amount of such relative rotation between the input and output shafts in a manner known in the art.

The pinion gear 14 has helical teeth which are meshingly engaged with straight cut teeth on a rack or linear steering member 20. The pinion gear in combination with the straight cut gear teeth on the rack member form a rack and pinion gear set. The rack is steerably coupled to the vehicle's steerable wheels 22, 24 with steering linkage in a known manner. When the steering wheel 12 is turned, the rack and pinion gear set converts the rotary motion of the steering wheel into linear motion of the rack. When the rack moves linearly, the steerable wheels 22, 24 pivot about their associated steering axes and the vehicle is steered.

An electric assist motor 26 is drivingly connected to the rack 20. When the electric motor 26 is energized, it provides power assist steering so as to aid in the rotation of the vehicle steering wheel by the vehicle operator. In accordance with a preferred embodiment of the present invention, the electric assist motor is a variable reluctance motor. A variable reluctance motor is desirable for use in an electric assist steering system because of its small size, low friction, and its high torque-to-inertia ratio.

As mentioned, the rack 20 has a straight rack tooth portion in meshing engagement with the pinion gear. The rack 20 also has a threaded convolution portion. The variable reluctance motor 26 circumscribes the rack 20 and is mounted in a motor housing. The motor 26, in accordance with a preferred embodiment of the present invention, includes eight stator poles and six rotor poles. The stator poles are arranged so as to be energizes in pairs designated Aa, Bb, Cc, and Dd.

The operation of a variable reluctance motor and its principle of operation are well known in the art. Basically, the stator poles are energized in pairs. The rotor moves so as to minimize the reluctance between the stator poles and the rotor poles. Minimum reluctance occurs when a pair of rotor poles are aligned with the energized stator poles. Once minimum reluctance is achieved, i.e., when the rotor poles align with the energized stator coils, those energized stator coils are de-energized and an adjacent pair of stator coils are energized. The direction of motor rotation is controlled by the sequence in which the stator coils are energized. The torque produced by the motor is controlled by the current through the stator coils.

The rotor of the motor 26 is drivingly connected to a ball-nut through a connection tube. The ball-nut drive circumscribes the threaded convolution portion of the rack 20 with the nut portion being operatively connected to the threaded convolution portion of the rack through a plurality of balls. Such an arrangement is fully described in U.S. Pat. No. 5,257,828 to Miller et al., assigned to TRW Inc., which is hereby fully incorporated herein by reference. When the motor is energized, the rotor turns which, in turn, rotates the nut portion of the ball-nut drive arrangement. When the nut rotates, the balls transfer a linear force to the rack. The direction of rack movement is dependent upon the direction of rotation of the motor.

A rotor position sensor 54 is operatively connected to the motor rotor and to the motor housing. The above-incorporated '828 patent shows and describes such a rotor position sensor in detail, this description being hereby incorporated herein by reference. The function of the rotor position sensor is to provide an electrical signal indicative of the position of the rotor relative to the motor stator. For proper operation of the variable reluctance motor, including direction of rotation and applied torque, it is necessary to know the position of the rotor relative to the stator.

In the preferred embodiment of the present invention, a physical rotor position sensor is provided. It is known in the art that the rotor position can be determined by means other than a physical position sensor. For example, it is possible to monitor the current through the nonenergized stator coils and, based upon the sensed current, the rotor position is determined. One specific arrangement for sensing rotor position without a separate position sensor is disclosed in U.S. Pat. No. 5,072,166 which is hereby fully incorporated herein.

The present invention contemplates the use of both a separate rotor position sensor and an algorithm that determines the rotor position based on some measured operating parameter such as current in an nonenergized coil.

A position sensor 100 is operatively connected across the input shaft 16 and the output shaft 17 and provides an electrical signal having a value indicative of the relative rotational position between the input shaft 16 and the output shaft 17. The position sensor 100 in combination with the torsion bar 18 form a torque sensor 110. The output of the position sensor is indicative of the applied steering torque to the vehicle steering wheel 12 by the vehicle operator.

The output of the torque sensor 110 is connected to an electronic control unit ("ECU") 120. Preferably, ECU 120 is a microcomputer but may comprise a plurality of discrete circuits and/or circuit components arranged to accomplish the desired functions. Specifically, the output of the torque sensor 110 is connected to a high speed assist curve circuit 122, a low speed assist curve circuit 124, and a sign detect circuit 126.

Figure 2:
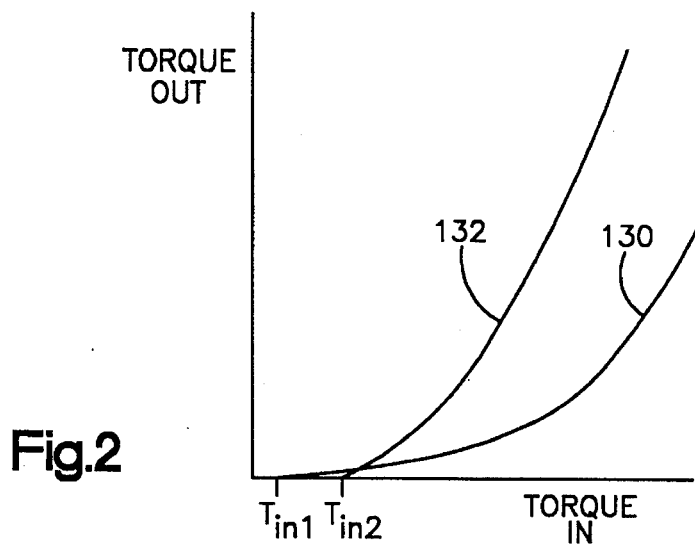
FIG. 2 is a graphical representation of the high speed assist curve and the low speed assist curve used by the steering system of FIG. 1.

Referring to FIGS. 1 and 2, the high speed assist curve circuit 122 and low speed assist curve circuit 124 are preferably look-up tables having a plurality of associated torque-in vs. torque-out assist values stored therein. Functional relationships could be employed instead of look-up tables. The high speed assist curve values 122 and the low speed assist curve 124 have torque-out values for the absolute value of torque-in. The steering direction or steering sign is reapplied to the magnitude value later in the signal processing. The curves 122, 124, in effect, strip the direction sign out of the processing.

The torque-in vs. torque-out values are also referred to as steering assist values since the torque-out value is the magnitude of the desired torque the electric assist motor is to provide for a particular applied steering torque. The line 130 represents a plot of desired torque-in vs. torque-out values for a high vehicle speed. These values may be determined in a variety of ways including empirical testing of the specific vehicle platform, i.e., a specific vehicle type, onto which the steering system 10 is to installed so as to achieve a desired steering feel at high speed. In accordance with one embodiment of the present invention, the curve 130 has a monotonically increasing value as a function of applied input torque.

The line 132 represents a plot of desired torque-in vs. torque-out values for low vehicle speed typically referred to as parking speed. These values may also be determined in a variety of ways including empirical testing of the specific vehicle platform onto which the steering system 10 is to installed so as to achieve a desired steering feel at low speed. In accordance with one embodiment of the present invention, the curve 132 has a monotonically increasing value as a function of applied input torque.

Since less steering assist is needed at higher vehicle speeds, the high speed assist values 130 are less that the low speed assist values 132 for a given torque-in value. The amount of steering input torque that must occur prior to the application of electric assist provided by the electric assist motor (torque-out), is referred to in the art as steering dead-band. Preferably, the dead-band $T_{in1}$ of the high speed assist curve 130 is less than the dead-band $T_{in2}$ of the low speed assist curve 132. This improves the on-center steering feel of the vehicle at high speed.

As mentioned, the output of the torque sensor 110 is connected to a sign detect circuit 126 that determines the direction (sign) of the steering torque and outputs a signal having a value indicative of the steering direction.

The high speed assist curve circuit 122 outputs a torque-out signal 130 having a value responsive to the value of the torque-in signal. The low speed assist curve circuit 124 outputs a torque-out signal 132 having a value responsive to the value of the torque-in signal. As mentioned, the high speed assist curve circuit 122 and the low speed assist curve circuit are preferably look-up tables with the values stored therein although a functional relationship could be employed. The outputs 130, 132 are connected to an assist interpolator circuit 140.

A vehicle speed sensor 150 is operative connected to the vehicle and outputs a signal having a value indicative of the vehicle's speed. Those skilled in the art appreciate that a vehicle speed sensor includes a device connected to the vehicle wheels or to the vehicle transmission that generates pulses at a frequency that is a function of the vehicle speed. The speed sensor further includes circuitry that converts the pulse frequency into a signal having a value indicative of the vehicle speed.

The output of the speed sensor 150 is connected to the ECU 120 and is specifically connected to a speed proportional gain curve circuit 156. This speed proportional gain curve function may be accomplished using a look-up table in a microcomputer or may be accomplished using an actual calculation in accordance with a desired control function.

As is well known in the art, the amount of steering assist desired from a steering assist system decreases as vehicle speed increases. Therefore, to maintain a proper or desirable feel during steering maneuvers, it is desirable to decrease the amount of steering assist as the vehicle speed increases. As discussed above, the high speed assist curve 130 and the low speed assist curve 132 reflects this decrease in steering assist as vehicle speed increases. The curves 130 and 132 represent assist value limits for high and low speeds. It is desired to have a smooth change in assist as vehicle speed changes. The speed proportional gain curve 156 is used by the present system to accomplish this smooth transition.

Figure 3:
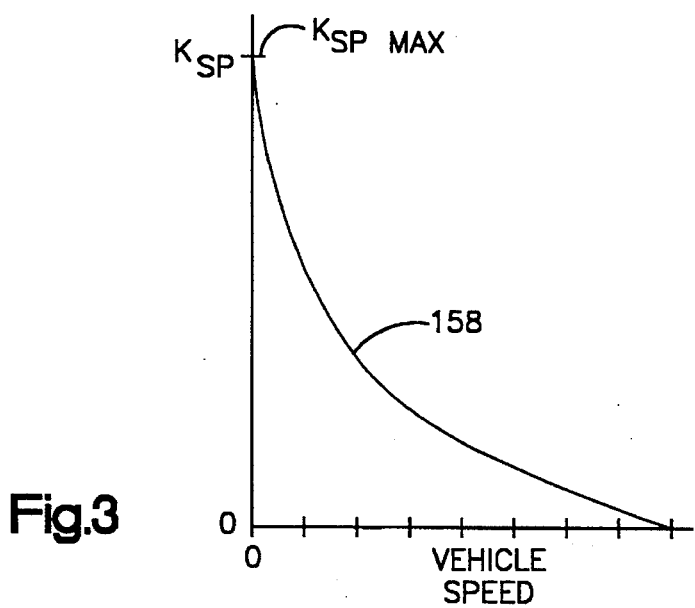
FIG. 3 is a graphical representation of the speed proportional gain value used by the steering system of FIG. 1.

Referring to FIG. 3, the speed proportional gain control value $K_{SP}$ is plotted against vehicle speed. At zero vehicle speed, the gain control value is maximum and is designated $K_{SPMAX}$. As vehicle speed increases, the value of $K_{SP}$ decreases until it finally reaches zero at a high vehicle speed value, e.g., 180 MPH. As mentioned, these values my be stored in a look-up table or may be calculated in accordance with a desired control function. The values stored or the control function used would be empirically determined so as to accomplished a desired steering feel for a particular vehicle platform. The output 158 of the speed proportional gain curve circuit 156 is connected to the assist interpolator 140.

The assist interpolator 140 determines a requested torque-out value used to control the electric assist motor in response to torque-in (the applied steering torque), the high speed value 130 and the low speed value 132 from curves 122, 124, respectively, and the vehicle speed. The purpose of the interpolator 140 is to provide a smooth changes in the torque-out value as applied steering torque changes and vehicle speed changes. The requested torque-out value 160 (referred to herein as $T_{ASSIST}$) output from the assist interpolator 140 is functionally related to (i) the value of the low speed torque-in vs. torque-out curve 132, (ii) the value of the high speed torque-in vs. torque-out curve 130, and (iii) the value of the speed proportional gain value $K_{SP}$. In accordance with a preferred embodiment of the present invention, the $T_{ASSIST}$ value 160 is determined in accordance with the following equation:

$$T_{ASSIST} = (K_{SP} \times T_{LOW}) + ((K_{SPMAX} - K_{SP}) \times T_{HIGH})$$

where $T_{LOW}$ is the torque-out value in accordance with the low speed assist curve 124 for a given or measured torquein value, $T_{HIGH}$ is the torque-out value in accordance with the high speed assist curve 122 for the torque-in value, $K_{SP}$ is the speed pro gain value from the curve 156 for a measured vehicle speed, and $K_{SPMAX}$ is the maximum speed proportional gain value from the look-up table 156.

Assume that the value of $K_{SPMAX}$ is equal to 1. The equation for $T_{ASSIST}$ then becomes $$T_{ASSIST} = (K_{SP} \times T_{LOW}) + ((1 - K_{SP}) \times T_{HIGH})$$

From this equation, it can be seen that at zero vehicle speed, the value of $K_{SP}$ is 1 so that the $T_{ASSIST}$ equation becomes $$T_{ASSIST} = (1 \times T_{LOW}) + ((1-1) \times T_{HIGH})$$

which can then be reduced to $$T_{ASSIST} = T_{LOW}$$

When the $K_{SP}$ value reaches a zero value at high vehicle speed, the $T_{ASSIST}$ values become $$T_{ASSIST} = (0 \times T_{LOW}) + ((1-0) \times T_{HIGH})$$

which can then be reduced to $$T_{ASSIST} = T_{HIGH}$$

Figure 5:
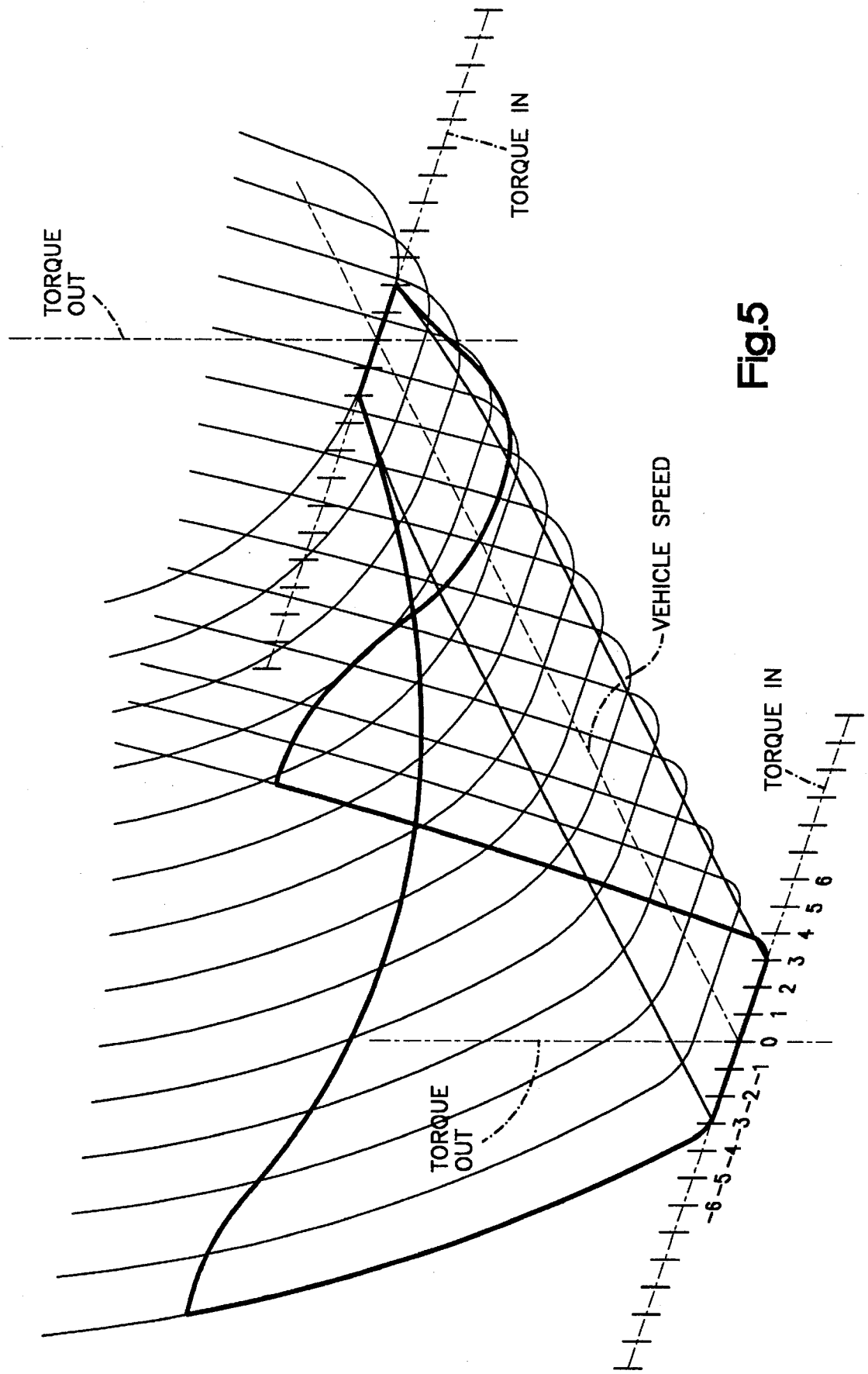
FIG. 5 is a three-dimensional graphic representation of $T_{ASSIST}$ plotted against a signed input torque and as a function of vehicle speed resulting from the steering system of FIG. 1.

As can be seen from these equations, the $T_{ASSIST}$ value 160 has a smooth continuous value having a value functionally related to the high and low assist curves and vehicle speed. A plot of $T_{ASSIST}$ against a signed input torque is shown in FIG. 5. The $T_{ASSIST}$ value is the magnitude of the assist requested from the electric assist motor to aid the driver in performing a steering maneuver while maintaining an adequate steering feel.

The output $T_{ASSIST}$ 160 is connected to a signed assist function 168 which recombines the torque assist value 160 with the direction signal from the sign detect circuit 126. The signed torque assist value is connected to a lead/lag filter 172. The lead/lag filter 172 processes the torque signal including amplifying the value of the torque signal. This arrangement of the lead/lag filter after the assist interpolator provides beneficial noise filtering.

As those skilled in the art will appreciate, high frequency signal noise may be present on the output of the torque sensor 110. If the output of the torque sensor were connected directly to the lead/lag filter 172 before being connected to the high speed assist curve 122 and the low speed assist curve 124, the high frequency noise would be amplified. The amplification of the high frequency noise would be greater than the amplification of the low frequency signal because of the differentiating characteristic of the lead/lag filter. This amplified noise could exceed the steering dead-band which would result in steering assist from the electric assist motor when none is being demanded by the driver. With the present arrangement of having the output of the torque sensor 110 connected to the high speed assist curve 122 and the low speed assist curve 124, their associated dead-bands filter the high frequency noise that is present on the torque sensor output prior to amplification by the lead/lag filter. Therefore, only signals with a favorable signal to noise ratio are applied to the lead/lag filter 172. This is also true if a lag/lead filter is employed for filter 172.

The output 174 of the lead/lag filter 172 is connected to a soft start control circuit 180. The soft start control circuit 180 is also operatively connected to the vehicle ignition switch 182 for detection of when the vehicle is first started. The purpose of the soft start control circuit is to prevent full assist from being provided to the vehicle the instant the vehicle is being started. It is not uncommon for the vehicle operator to be applying torque to the steering wheel with one hand while he is turning the ignition switch to the starting position. If full power assist were immediately available, the steering wheel would jerk in his hand. The soft start circuit prevents this unpleasant event from happening and simulates the operation of a hydraulic power assist steering system which does not provide full power assist until the vehicle motor is running at speed (as opposed to cranking speed).

The output of the soft start circuit, after an initial time delay for starting of the vehicle, is the torque request value $T_{ASSIST}$. The output of the soft start circuit 180 is connected to a thermal and current fold-back circuit 188 that further modifies the torque request signal $T_{ASSIST}$ as a function of the current through the motor 26 and the temperature of the ECU 120. An ECU temperature sensor 192 monitors the temperature of the ECU and provides a signal to the current and thermal fold back circuit 188 indicative of the temperature of the ECU. As the temperature of the ECU increases, the current and thermal fold back circuit 188 decreases the value of the torque request signal $T_{ASSIST}$.

A motor current sensor 196 is operatively connected to the electric motor 26 for sensing the amount of current through the motor. The output of the current sensor 196 is connected to the thermal and current fold-back circuit 188. If the sensed current through the motor is too high, i.e., greater than a predetermined value, the torque request signal $T_{ASSIST}$ is decreased.

The output of the fold-back circuit 188 is connected to the torque command circuit 200 which includes both a torque request value and a steering direction value. The torque command signal output from the current and thermal fold back circuit 188 has been "corrected" for (i) vehicle speed, (ii) soft start, (iii) sensed motor current, and (iv) sensed temperature of the ECU. The output of the torque command circuit 200 is connected as one input of a summing circuit 210.

The output of the summing circuit 210 is connected to the input of a drive control circuit 216. The output of the motor position sensor 54 is also connected to the drive control circuit 216. Based upon the torque command signal output from the summing circuit 210 and based upon the position of the rotor, the drive control circuit 216 provides a motor control signal used to control energization of the electric assist motor 26 in terms of sequence and current applied to the stator coils through a plurality of power switches 220.

The drive control circuit 216 is preferably is a microcomputer. Commutation or drive pulses may need to be output to the stator windings at a rate faster than the motor position data can be processed from the sensor 54 to insure smooth operation of the variable reluctance motor. To solve this problem, it is preferable that the position of the rotor be estimated at predetermined times between actual rotor position measurements based upon certain known conditions and certain assumptions. Rotor position estimation is described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A Lumsdaine, J. H. Lang, and M. J. Balas, 19th ASILOMAR Conference on Circuits, Systems & Computers, November 6–8, 1985, both papers being hereby fully incorporated herein by reference. Current control is accomplished by the drive control circuit pulse-width-modulating ("PWM") the switches 220.

The output from the rotor position sensor 54 is also connected to a motor speed sensor circuit 230. The change in the rotor position as a function of time is indicative of the rotor and, in turn, the motor speed. The output of the motor speed sensing circuit is an electric signal having a value indicative of the motor speed. Rather than differentiating the rotor position, i.e., change in rotor position as a function of time, those skilled in the art will appreciate that other speed sensing arrangements could be used to determine rotor speed such as a tachometer connected to the rotor or a curve fitting arrangement using look-up tables.

The output of the speed sensor 230 is connected to a decision circuit 240 that determines if the motor speed $W_M$ is greater than a predetermined value "x". If it is, then the value of the motor speed from the sensor 230 is passed to a multiplier circuit 250.

Figure 4:
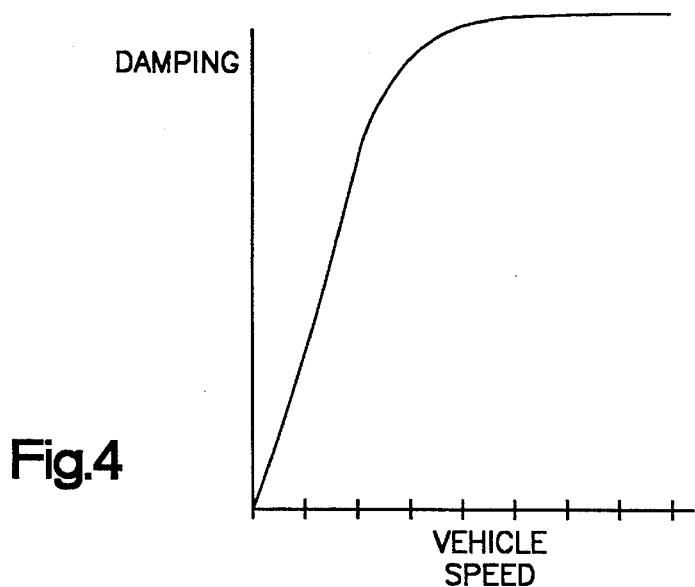
FIG. 4 is a graphical representation of the damping curve used by the steering system of FIG. 1.

The output of the vehicle speed sensor 150 is connected to a damping control circuit 260 that outputs a damping control signal having a value functionally related to the value of the sensed vehicle speed. Referring to FIG. 4, a damping value as a function of vehicle speed is depicted. The actual damping value can be empirically determined for a particular vehicle platform. It has been found that a zero damping value at zero vehicle speed and a damping value is that equal to the damping value found in a hydraulic power assist steering system at a vehicle speed of 55 MPH provides an adequate steering feel. The increase in the damping value between zero and 55 MPH is preferably linear. At 110 mph, the damping value output from the circuit 260 is preferably equal to twice that found in a hydraulic power assist steering system at 55 mph. The output of the damping control circuit 260 is connected as a second input of the multiplier circuit 250. The output of the multiplier circuit 250 is the second input of the summing circuit 210.

When a vehicle is in a steering maneuver, i.e., the steering wheel and the steerable wheels are turned while the vehicle is traveling, road forces and caster of the steerable wheels tend to return the steerable wheels to a straight-ahead position. Damping is the amount of retarding force to the movement of the steerable wheels as a function of turning rate. If the damping is equal to zero, there is no resistance to the wheels steering. If the vehicle is traveling at high speed and the damping is zero, the vehicle may become unstable resulting in increasing yaw rate of the vehicle and "spinning-out."

The damping of the vehicle yaw by control of the electric assist steering, in accordance with a preferred embodiment, is functionally related to both the sensed vehicle speed and the sensed speed of the power assist motor. When the vehicle is traveling at parking speeds, damping is low since the return force acting on the vehicle steerable is very small. As the vehicle speed increases, the damping value output from the circuit 260 increases. The output from the motor speed sensor circuit 230 is providing a value indicative of how fast the steerable wheels are steering to the straight-ahead position. The faster the steerable wheels are steering, the greater the damping that will be in effect. Based on vehicle steering system geometry, other damping coefficient calibration may be desirable for good "feel." The damping value from the output of the multiplier 250 is the negative input to the summing circuit 210.

It should be appreciated that the damping is functionally related to the motor rate feed-back and is also functionally related to the sensed vehicle speed. Although one would like an electric assist system to simulate the feel of a hydraulic system, the present arrangement provides an improved handling stability at high vehicle speeds, e.g., greater than 55 mph, over that of known hydraulic assist steering systems.

It should further be appreciated that it is desirable to include self-diagnostic features in the drive control circuit to issue proper operation of the power assist arrangement. Such a diagnostic arrangement for electric assist steering systems is fully described in U.S. Pat. No. 4,660,671 which is hereby fully incorporated herein by reference.

From the above description of preferred embodiments of the invention, those skilled in the art will perceive improvements, changes and modifications. Such improvements, changes and modifications within the skill of the art are intended to be covered by the appended claims.

Having fully described the invention, the following is claimed:

1. An apparatus for controlling a steering assist system, said steering assist system providing steering assist in response to a steering control signal, said apparatus comprising:

vehicle speed sensing means for sensing vehicle speed and for providing a speed signal having a value indicative of the sensed vehicle speed;

torque sensing means operatively connected to a vehicle hand wheel for sensing applied steering torque and providing a torque signal indicative of applied steering torque; and control means operatively connected to said vehicle speed sensing means and to said torque sensing means and including a first set of torque-in vs. torque-out assist values associated with a first vehicle speed and a second set of torque-in vs. torque-out assist values associated with a second vehicle speed different from said first vehicle speed, said control means providing said steering control signal in response to said applied steering torque and having a value interpolated from values related to (i) said speed signal and (ii) both said first set and second set of assist values.

2. The apparatus of claim 1 wherein said first vehicle speed is a relatively low vehicle speed and wherein said torque-in vs. torque-out assist values associated with said first vehicle speed increases in accordance with a first monotonically increasing function after a first predetermined torque-in value is exceeded.

3. The apparatus of claim 2 wherein said second vehicle speed is a relatively high vehicle speed and wherein said torque-in vs. torque-out assist values associated with said second vehicle speed increases in accordance with a second monotonically increasing function after a second predetermined torque-in value is exceeded.

4. The apparatus of claim 3 wherein said second predetermined torque-in value is less than said first predetermined torque-in value.

5. An apparatus for controlling a steering assist system, said steering assist system providing steering assist in response to a steering control signal, said apparatus comprising:

vehicle speed sensing means for sensing vehicle speed and for providing a speed signal having a value indicative of the sensed vehicle speed;

torque sensing means operatively connected to a vehicle hand wheel for sensing applied steering torque and providing a torque signal indicative of applied steering torque; and control means operatively connected to said vehicle speed sensing means and to said torque sensing means and including a first set of torque-in vs. torque-out assist values associated with a first vehicle speed wherein said first vehicle speed is a relatively low vehicle speed and said torque-in vs. torque-out assist values associated with said first vehicle speed increases in accordance with a first monotonically increasing function after a first predetermined torque-in value is exceeded, said control means further including a second set of torque-in vs. torque-out assist values associated with a second vehicle speed different than said first vehicle speed wherein said second vehicle speed is a relatively high vehicle speed and wherein said torque-in vs. torque-out assist values associated with said second vehicle speed increases in accordance with a second monotonically increasing function after a second predetermined torque-in value is exceeded, said control means providing said steering control signal in response to said applied steering torque and having a value functionally related to (i) said speed signal and (ii) both said first set and second set of assist values wherein said steering control signal is functionally related to a requested torque assist value $T_{ASSIST}$ value determined according to $$T_{ASSIST}=(K_{SP} \times T_{LOW})+((K_{SPMAX}-K_{SP}) \times T_{HIGH})$$

where $T_{LOW}$ is the torque-out value in accordance with the first set of assist values, $T_{HIGH}$ is the torque-out value in accordance with the second set of assist values, $K_{SP}$ is a speed proportion value that decreases as vehicle speed increases, and $K_{SPMAX}$ is the maximum speed proportional value at low vehicle speed.

6. The apparatus of claim 5 wherein said first predetermined torque-in value and said second predetermined torque-in value are sufficiently large to filter high frequency noise from said torque signal.

7. The apparatus of claim 6 further including a lead/lag filter for filtering said requested torque assist value.

8. An method of controlling a steering assist system, said steering assist system providing steering assist in response to a steering control signal, said method comprising the steps of:

sensing vehicle speed and providing a speed signal having a value indicative of the sensed vehicle speed;

sensing applied steering torque and providing a torque signal indicative of applied steering torque;

providing a first set of torque-in vs. torque-out assist values associated with a first vehicle speed;

providing a second set of torque-in vs. torque-out assist values associated with a second vehicle speed different from said first vehicle speed; and providing said steering control signal in response to said applied steering torque by interpolating from values related to (i) said vehicle speed signal and (ii) both said first set and second set of torque-in vs. torque-out assist values.

9. An method of controlling a steering assist system, said steering assist system providing steering assist in response to a steering control signal, said method comprising the steps of:

sensing vehicle speed and providing a speed signal having a value indicative of the sensed vehicle speed;

sensing applied steering torque and providing a torque signal indicative of applied steering torque;

providing a first set of torque-in vs. torque-out assist values associated with a first vehicle speed;

providing a second set of torque-in vs. torque-out assist values associated with a second vehicle speed different from said first vehicle speed; and providing said steering control signal in response to said applied steering torque and having a value functionally related to (i) said vehicle speed signal and (ii) both said first set and second set of torque-in vso torque-out assist values wherein said step of providing said steering control signal includes determining a requested torque assist value $T_{ASSIST}$ value determined according to $$T_{ASSIST}=(K_{SP} \times T_{LOW})+((K_{SPMAX}-K_{SP}) \times T_{HIGH})$$

where $T_{LOW}$ is the torque-out value in accordance with the first set of assist values, $T_{HIGH}$ is the torque-out value in accordance with the second set of assist values, $K_{SP}$ is a speed proportion value that decreases as vehicle speed increases, and $K_{SPMAX}$ is the maximum speed proportional value at low vehicle speed.

\* \* \* \* \*